US012683838B2

(12) United States Patent (10) Patent No.: US 12,683,838 B2

Masuda (45) Date of Patent: Jul. 14, 2026

(54) COMMUNICATION DEVICE

(71) Applicant: ROHM CO., LTD., Kyoto (JP)

(72) Inventor: Shinya Masuda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 18/789,015

(22) Filed: Jul. 30, 2024

(65) Prior Publication Data

US 2025/0047532 A1     Feb. 6, 2025

(30) Foreign Application Priority Data

Aug. 2, 2023    (JP) ................................. 2023-126427

(51) Int. Cl.
  *H04L 23/02*        (2006.01)
  *H02M 1/00*         (2006.01)
  *H04L 25/49*        (2006.01)
(52) U.S. Cl.
  CPC ...... *H04L 25/4902* (2013.01); *H02M 1/0029* (2021.05)
(58) Field of Classification Search
  CPC ...... H03K 7/08; H04B 14/026; H04B 14/046; H04L 25/03; H04L 25/4902; H04L 12/0435
  USPC ................................. 375/262, 260, 267, 299
  See application file for complete search history.

(56) References Cited

U.S. PATENT DOCUMENTS

| | | | |
|---|---|---|---|
| 11,996,962 B2 | 5/2024 | Masuda et al. | |
| 2016/0314092 A1* | 10/2016 | Suzuki ...................... | G06F 1/08 |
| 2020/0106433 A1* | 4/2020 | Yamato ................ | H03K 17/163 |
| 2020/0235739 A1* | 7/2020 | Si ......................... | G06F 13/4295 |
| 2021/0409017 A1* | 12/2021 | Miyamae ................ | H04L 12/40 |
| 2022/0070018 A1* | 3/2022 | Paleti ...................... | H04L 12/40 |
| 2022/0166644 A1* | 5/2022 | Ngo ................... | H04L 25/4902 |
| 2023/0035309 A1 | 2/2023 | Masuda et al. | |
| 2023/0061287 A1* | 3/2023 | Ishibashi .................. | B60Q 3/74 |
| 2023/0268918 A1* | 8/2023 | Hayashi .............. | H02M 1/0029 327/427 |
| 2024/0056334 A1* | 2/2024 | Cline ...................... | H04L 12/10 |

FOREIGN PATENT DOCUMENTS

| | | |
|---|---|---|
| WO | WO 2021/085169 | 5/2021 |

* cited by examiner

*Primary Examiner* — Khai Tran
(74) *Attorney, Agent, or Firm* — Fish & Richardson P.C.

(57) ABSTRACT

A communication device includes a communication line, a master node, and a slave node. At least one of the master node or the slave node is configured to switch to either a first state in which feedback input of a bus voltage of the communication line is received to control a slew rate of the bus voltage to a desired value, and a second state in which input of a predetermined control signal is received to control the slew rate of the bus voltage to a desired value.

6 Claims, 9 Drawing Sheets

COMMUNICATION DEVICE

INCORPORATION BY REFERENCE

This nonprovisional application claims priority under 35 U.S.C. § 119(a) on Patent Application No. 2023-126427 filed in Japan on Aug. 2, 2023, the entire contents of which are hereby incorporated by reference.

BACKGROUND OF THE DISCLOSURE

Field of the Invention

The present disclosure relates to a communication device.

Description of the Related Art

Recently, in the field of in-vehicle communication, communication devices (such as clock extension peripheral interface (CXPI) communication devices) are in practical use. These communication devices use pulse-width modulation signals as line codes between multiple nodes (master node and slave nodes) connected to a communication line.

SUMMARY OF THE DISCLOSURE

A communication device according to one aspect of the present disclosure includes a communication line, a master node connected to the communication line, and a slave node connected to the communication line, in which the master node and the slave node communicate with each other by using a pulse width modulation signal as a line code. At least one of the master node or the slave node is configured to switch to either a first state in which feedback input of a bus voltage of the communication line is received to control a slew rate of the bus voltage to a desired value, and a second state in which input of a predetermined control signal is received to control the slew rate of the bus voltage to a desired value.

DESCRIPTION OF THE PREFERRED EMBODIMENTS

Communication Device of Comparison Example

Figure 1:
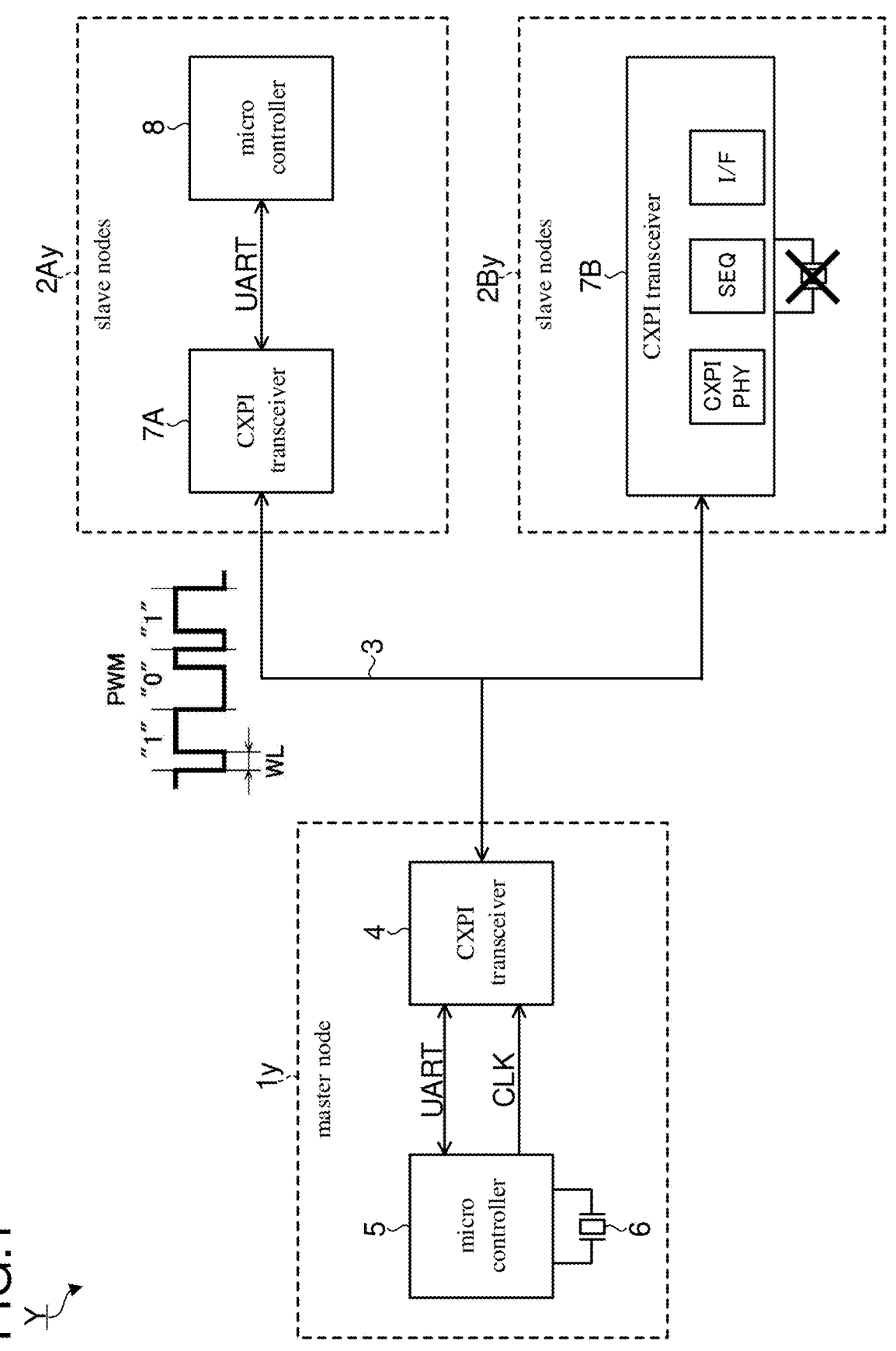
FIG. 1 is a block diagram illustrating the overall configuration of a communication device of a comparative example.

First, a communication device Y, which is a comparison example used for comparison with a communication device X of the present disclosure (i.e., a configuration to be compared with the embodiment of the present disclosure described below), will be described with reference to FIG. 1. FIG. 1 is a block diagram illustrating the overall configuration of the communication device Y of the comparative example.

The communication device Y is installed in a vehicle as a means to construct an in-vehicle local area network (LAN). The communication device Y includes a master node 1y, multiple slave nodes (slave nodes 2Ay and 2By, as described with reference to the figure), and a communication line 3. Note that the communication device Y conforms to the CXPI protocol and uses pulse width modulation signals PWM as line codes between the multiple nodes connected to the communication line 3.

The master node 1y is, for example, a body control module (BCM) (or an electronic control unit (ECU) mounted on a BCM) that comprehensively controls components such as wipers and interior lights. The master node 1y includes a CXPI transceiver 4, a microcontroller 5, and an oscillator 6.

The slave node 2Ay is, for example, a wiper (or an ECU mounted in a wiper). The slave node 2Ay includes a CXPI transceiver 7A and a microcontroller 8.

The slave node 2By is, for example, an interior light (or an ECU mounted in an interior light). The slave node 2By includes a microcontroller-less CXPI transceiver 7B. The microcontroller-less CXPI transceiver 7B includes, for example, a CXPI physical layer, a sequencer, and an interface (driver, etc.).

The communication line 3 is a so-called harness (wire harness), which is stretched over various components of the vehicle. Note that, in addition to the wiper and interior light mentioned above, various in-vehicle devices such as air conditioners and door mirrors can also be assumed as the slave nodes connected to the communication line 3.

The features of the CXPI protocol will now be briefly described. First, the microcontrollers 5 and 8 can each communicate using a general-purpose universal asynchronous receiver/transmitter (UART) interface. Second, bidirectional communication between the CXPI transceiver 4 and the CXPI transceivers 7A and 7B is achieved using the pulse width modulation signal PWM obtained by superimposing data on a communication clock CLK. Third, the slave nodes 2Ay and 2By can extract the communication clock CLK from the pulse width modulation signal PWM, and thus they do not need to be equipped with individual oscillators. Fourth, in the communication device Y, bidirectional communication among the multiple nodes is achieved in synchronization with the communication clock CLK generated by the oscillator 6 of the master node 1y.

Next, bidirectional communication using the pulse width modulation signal PWM will be described. The logic value of the data superimposed on the pulse width modulation signal PWM is determined according to the length (=pulse width WL) of the period during which the pulse width modulation signal PWM is at low level (dominant level).

Specifically, the logic value is determined as follows. When the pulse width WL is shorter than a predetermined logic judgment value, the logic value of the data is judged to be [1]. On the other hand, when the pulse width WL is longer than the logic judgment value, the logic value of the data is judged to be [0].

When transmitting the data[1] from the master node 1y, the CXPI transceiver 4 sets the low level period (=pulse width WL) of the pulse width modulation signal PWM shorter than the logic judgment value. On the other hand, when transmitting the data[0] from the master node 1y, the CXPI transceiver 4 sets the low level period (=pulse width WL) of the pulse width modulation signal PWM longer than the logic judgment value.

Note that the master node 1y is always in a state of transmitting the data[1] during a data transmission period of the slave node 2Ay or 2By (=data reception period of the master node 1y), that is, the master node 1y is always in a state of transmitting the communication clock CLK for synchronization to slave nodes 2Ay and 2By.

At this time, the CXPI transceiver 7A or 7B decides whether to extend the low level period (=pulse width WL) of the pulse width modulation signal PWM, depending on the data to be transmitted from the slave node 2Ay or 2By.

More specifically, when transmitting the data[0] from slave node 2Ay or 2By, the low level period of the pulse width modulation signal PWM is extended and the pulse width WL becomes longer than the logic judgment value. On the other hand, when transmitting the data[1] from the slave node 2Ay or 2By, the low level period of the pulse width modulation signal PWM is not extended and the pulse width WL remains shorter than the logic judgment value.

Note that, the communication device Y conforming to the CXPI protocol is configured such that the low level (dominant level) of the pulse width modulation signal PWM is dominant over the high level (recessive level). Therefore, in a case where data (master-side transmission signal and slave-side transfer signal) transmitted from each of the master node 1y and the slave nodes 2Ay and 2By collide, whichever node sends out the low level (dominant level) for longer will be dominant in arbitration. Also note that the above-mentioned part of the configuration of the communication device Y is the same configuration in the communication device X described below.

Next, the master node 1y and the slave node 2Ay will be described in more detail. The slave node 2By and the slave node 2Ay have the same basic configuration. For this reason, only the slave node 2Ay will be described here, and description of the slave node 2By will be omitted.

Figure 2:
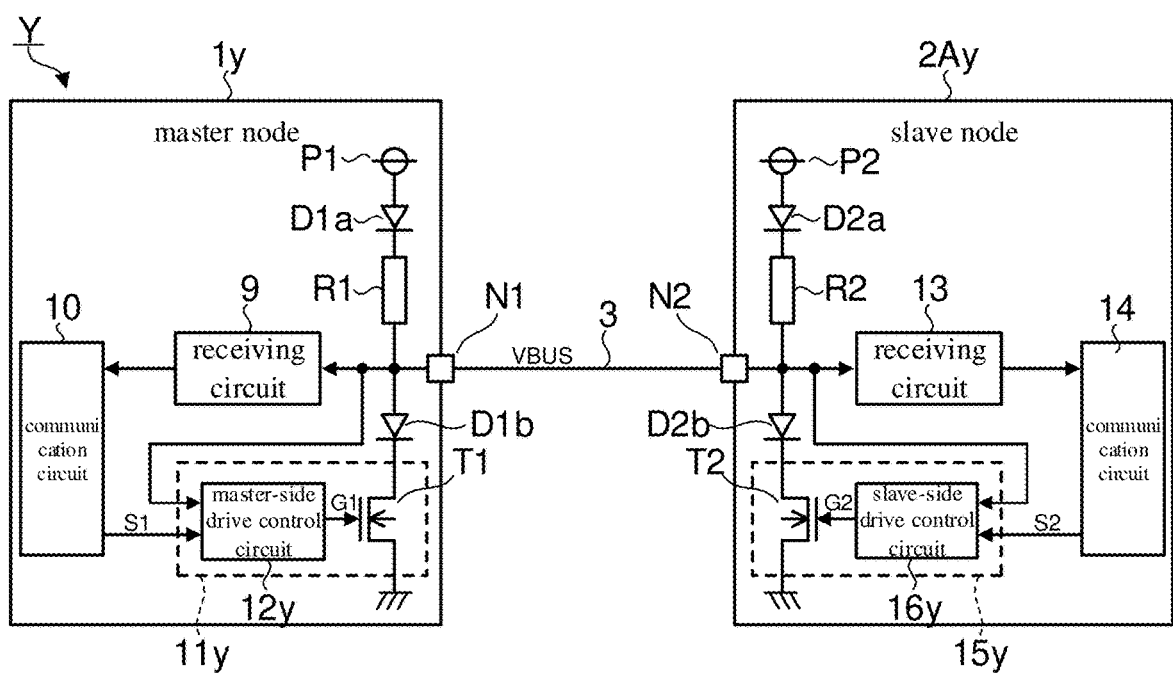
FIG. 2 is a block diagram illustrating a configuration of a communication device.

FIG. 2 is a block diagram illustrating a configuration of the communication device Y. As illustrated in FIG. 2, the master node 1y includes an external terminal N1 as a means of establishing an electrical connection with an external device. The slave node 2Ay includes an external terminal N2 as a means of establishing an electrical connection with an external device. A first end of the communication line 3 is connected to the external terminal N1. A second end of the communication line 3 is connected to the external terminal N2. The master node 1y will be described first. Then, the slave node 2Ay will be described.

The master node 1y consists of a diode D1a, a diode D1b, a terminating resistor R1, a receiving circuit 9, a communication circuit 10, and a waveform shaping circuit 11y.

The anode of the diode D1a is connected to a power supply end P1. The cathode of the diode D1a is connected to a first end of the termination resistor R1. A second end of the termination resistor R1 is connected to the external terminal N1. The anode of the diode D1b is connected to the second end of termination resistor R1. The cathode of the diode D1b is connected to the drain of a master-side transistor T1 to be described below.

The receiving circuit 9 detects the pulse width WL of a bus voltage VBUS (=pulse width modulation signal PWM) appearing on the communication line 3, and outputs the detection result to the communication circuit 10. A comparator that compares the bus voltage VBUS with a predetermined logic judgment value can be suitably used as the receiving circuit 9.

The communication circuit 10 receives the data (slave-side transfer signal) transmitted from the slave node 2Ay by receiving the output of the receiving circuit 9. The communication circuit 10 also outputs a first signal S1, which is data superimposed on the communication clock, to the waveform shaping circuit 11y (more precisely, a master-side drive control circuit 12y to be described below).

The waveform shaping circuit 11y transmits the data (master-side transmission signal) to the slave node 2Ay based on the first signal S1 and the bus voltage VBUS.

Specifically, the waveform shaping circuit 11y includes the master-side drive control circuit 12y and the master-side transistor T1. The master-side drive control circuit 12y generates a drive signal G1 based on the first signal S1 input from the communication circuit 10 and the bus voltage VBUS. The master-side drive control circuit 12y generates the drive signal G1 to have a period the same as the period of the first signal S1.

The master-side drive control circuit 12y controls a slew rate of the drive signal G1 based on the first signal S1 and the bus voltage VBUS. Specifically, at the logic level switching timing of the first signal S1, a predetermined slew rate (slope) is added to the rising/falling edge of the drive signal G1.

The master-side transistor T1 is an N-channel type metal oxide semiconductor field effect transistor (NMOSFET). The source of the master-side transistor T1 is connected to a ground terminal. The gate of the master-side transistor T1 is connected to an application end of the drive signal G1 (=output end of the master-side drive control circuit 12y). The drain of the master-side transistor T1 is connected to the communication line 3 (more precisely, the external terminal N1) via the diode D1b.

The master-side transistor T1 turns on when the drive signal G1 is at high level and turns off when the drive signal G1 is at low level.

The slave node 2Ay consists of a diode D2a, a diode D2b, a receiving circuit 13, a communication circuit 14, a waveform shaping circuit 15y, and a termination resistor R2.

The anode of the diode D2a is connected to a power supply end P2. The cathode of the diode D2a is connected to a first end of the termination resistor R2. A second end of the termination resistor R2 is connected to the external terminal N2. A resistance value of the termination resistor R2 is greater than a resistance value of the termination resistor R1. For example, the resistance value of the termination resistor R1 can be 1 kΩ, and the resistance value of the termination resistor R2 can be 30 kΩ.

The anode of the diode D2b is connected to the second end of the termination resistor R2. The cathode of the diode D2b is connected to the drain of a slave-side transistor T2 to be described below.

The receiving circuit 13 detects the pulse width WL of the bus voltage VBUS (=pulse width modulation signal PWM) appearing on the communication line 3, and outputs the detection result to the communication circuit 14. As the receiving circuit 13, a comparator that compares the bus voltage VBUS with a predetermined logic judgment value can be suitably used. Note that the slave node 2Ay is configured to be able to record the length of the pulse width WL of the bus voltage VBUS.

The communication circuit 14 receives data (master-side transmission signal) transmitted from the master node 1y by receiving the output of the receiving circuit 13. The communication circuit 14 can detect, from the output of the receiving circuit 13, the communication clock used to generate the first signal S1, that is, the switching timing of the logic level of the first signal S1 (in other words, the switching timing of the logic level of the drive signal G1). The communication circuit 14 outputs, to the waveform shaping circuit 15y (more precisely, a slave-side drive control circuit 16y to be described below), the second signal S2, which is obtained by superimposing data on the communication clock and is detected from the output of the receiving circuit 13.

The waveform shaping circuit 15y transmits data (slave-side transfer signal) to the master node 1y based on the second signal S2 and the bus voltage VBUS.

Specifically, the waveform shaping circuit 15y includes the slave-side drive control circuit 16y and the slave-side transistor T2. The slave-side drive control circuit 16y generates a drive signal G2 based on the second signal S2 input from the communication circuit 14 and the bus voltage VBUS. The slave-side drive control circuit 16y generates the drive signal G2 to have the same period as the period of the second signal S2.

The slave-side drive control circuit 16y controls the slew rate of the drive signal G2 based on the second signal S2 and the bus voltage VBUS. Specifically, at the logic level switching timing of the second signal S2, a predetermined slew rate is added to the rising/falling edge of the drive signal G2.

The slave-side transistor T2 is an NMOSFET. The source of the slave-side transistor T2 is connected to the ground terminal. The gate of the slave-side transistor T2 is connected to an application end (=output end of the slave-side drive control circuit 16y) of the drive signal G2. The drain of the slave-side transistor T2 is connected to the communication line 3 (more precisely, the external terminal N2) via the diode D2*b*.

The slave-side transistor T2 turns on when the drive signal G2 is at high level and turns off when the drive signal G2 is at low level. Hereafter, the bus voltage VBUS in a state where both the master-side transistor T1 and the slave-side transistor T2 are off is referred to as the first voltage V1. The first voltage V1 is about 12 V.

In a state where the master-side transistor T1 is on and slave-side transistor T2 is off, a microcurrent flows in communication line 3 in the direction from the slave node 2Ay to the master node 1y. More precisely, a current flows from the power supply end P2 through the communication line 3 to the ground end via the diode D1*b* and the master-side transistor T1. Since this current flows through the termination resistor R2 that has a high resistance value, the current value of the current is minute. Also in this state, a current flows from the power supply end P1 to the ground end via the diode D1*b* and the master-side transistor T1. This current does not flow to the communication line 3.

The bus voltage VBUS in this state (=master-side transistor T1 is on and slave-side transistor T2 is off) is the second voltage V2. The voltage value of the second voltage V2 corresponds to a value of a forward drop voltage of the diode D1*b*, which is about 0.7 to 0.8 V.

In a state where both the master-side transistor T1 and the slave-side transistor T2 are on, a current flows in the communication line 3 in the direction from the master node 1y to the slave node 2Ay. This current is approximately equal to a current value obtained by subtracting the current flowing toward the ground end via the master-side transistor T1 from the current flowing from the power supply end P1 via the termination resistor R1 that has a low resistance value (e.g., 1 kΩ).

The bus voltage VBUS in this state (=both master-side transistor T1 and slave-side transistor T2 are on) is the third voltage V3. The voltage value of the third voltage V3 is a forward drop voltage of each of the diodes D1*b* and D2*b*, and is about 0.6 V.

In a state where both the master-side transistor T1 and the slave-side transistor T2 are on, the current flowing from the power supply end P1 is divided into a current flowing to the ground end via the diode D1*b* and a current flowing to the ground end via the communication line 3 and the diode D2*b*. Thus, the current value flowing through the diode D1*b* is smaller than that in the state where the master-side transistor T1 is on and the slave-side transistor T2 is off, and the forward drop voltage of the diode D1*b* decreases. Accordingly, the third voltage V3 becomes smaller than the second voltage V2. The forward drop voltage of the diode D2*b* similarly decreases.

In a state where the master-side transistor T1 is off and the slave-side transistor T2 is on, a current flows in the communication line 3 in the direction from the master node 1y to the slave node 2Ay. This current corresponds to almost the entire large current flowing through the termination resistor R1 that has a low resistance value. Accordingly, the current value increases compared to a case where both the master-side transistor T1 and the slave-side transistor T2 are on. Thus, the bus voltage VBUS in this state (=master-side transistor T1 is off and slave-side transistor T2 is on) is larger than the bus voltage VBUS in a state where both the master-side transistor T1 and the slave-side transistor T2 are on. The bus voltage VBUS in this state is approximately equal to the second voltage V2.

<Data Transmission Between Nodes>

Next, data transmission between the master node 1y and the slave node 2Ay will be explained in detail with reference to timing charts. As described above, communication between the master node 1y and the slave node 2Ay in the communication device Y is achieved by a communication method that distinguishes between logical values (=data[0] or data[1]) depending on whether the pulse width WL (=length of low level period) of the pulse width modulation signal PWM exceeds a predetermined logic judgment value. Specifically, the following method is used.

Figure 3:
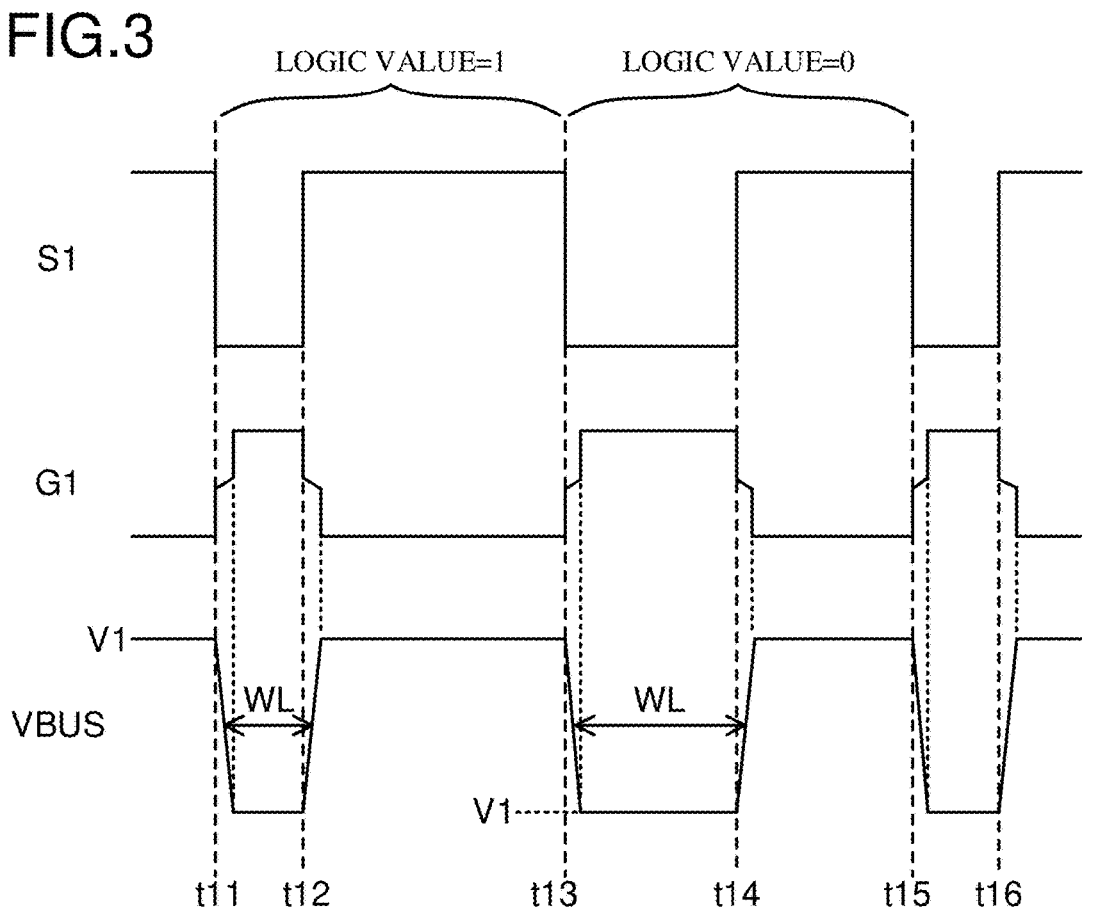
FIG. 3 is a timing chart showing a first signal, a drive signal, and bus voltage during data transmission at a master node.

First, a case in which the master node 1y transmits data to the slave node 2Ay will be described. FIG. 3 is a timing chart showing the first signal S1, the drive signal G1, and the bus voltage VBUS during data transmission by the master node 1y.

During the data transmission period of the master node 1y, the master node 1y is basically in a state of outputting the data[1] to the communication line 3. This state is a state during a period from time t11 to time t13, as will be described with reference to FIG. 3. At this time, the drive signal G1 is pulse driven with "ON" duty (=Ton/T, where T is the switching cycle and Ton is the ON period) such that the pulse width WL (=length of low level period) of the pulse width modulation signal PWM is below the logic judgment value.

In the data transmission period of the master node 1y, in a case where the master node 1y outputs the data[0] to the communication line 3, the drive signal G1 is pulse driven with "ON" duty such that the pulse width WL (=length of low level period) of the pulse width modulation signal PWM exceeds the logic judgment value. This state is a state during a period from time t13 to time t15, which will be described with reference to FIG. 3.

As described above, the master-side drive control circuit 12y adds a slew rate to the rising/falling edge of the drive signal G1 at the logic level switching timing of the first signal S1. Referring to FIG. 3, a predetermined slew rate (slope) is added to the drive signal G1 at times t11, t13, and t15, and at times t12, t14, and t16.

By adding a slew rate to the rising/falling edge of the drive signal G1, the bus voltage VBUS changes with a predetermined slew rate while changing between the first and second voltages V1 and V2.

Figure 4:
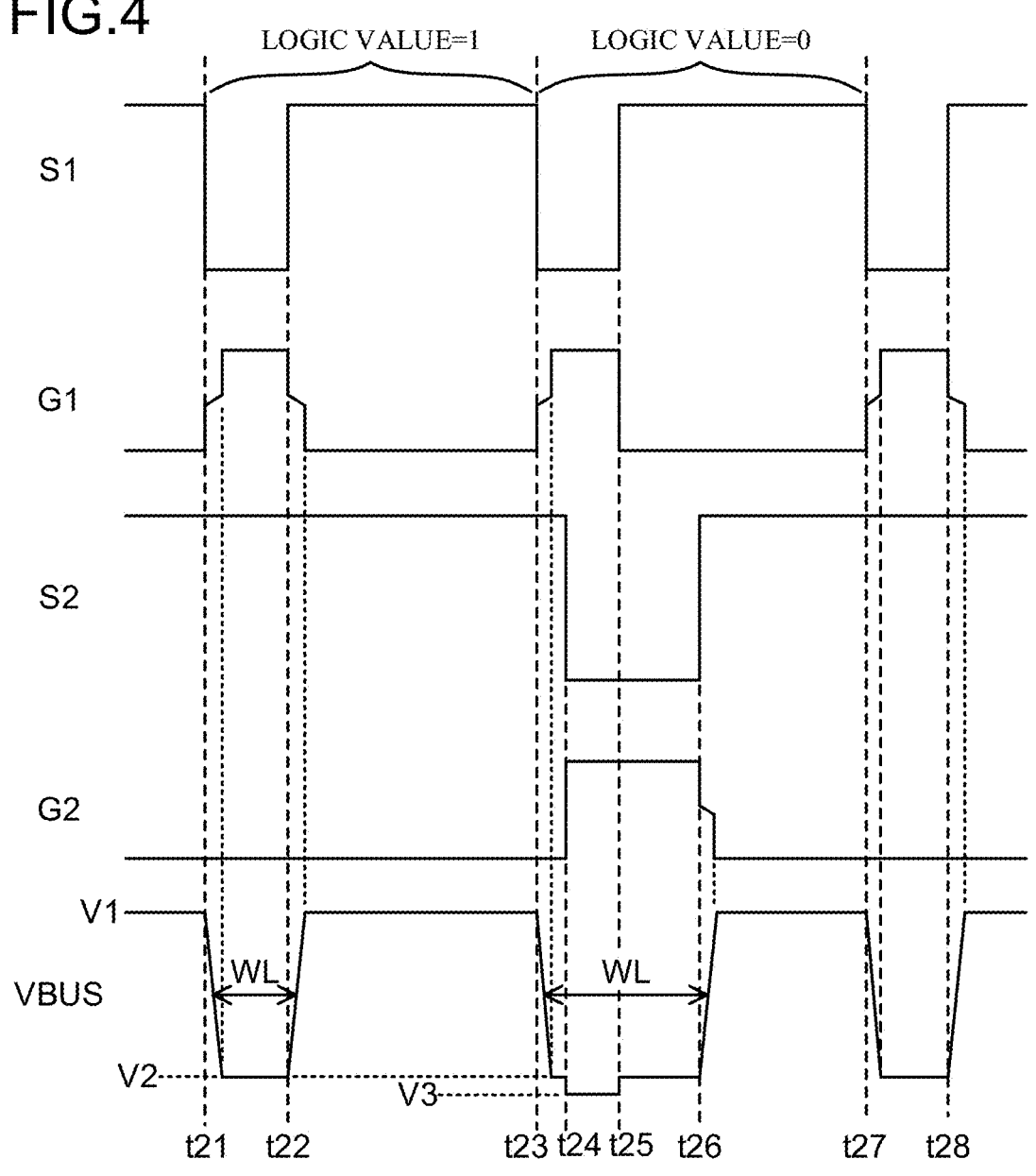
FIG. 4 is a timing chart showing a first signal, a drive signal, a second signal, a drive signal, and bus voltage during data transmission at a slave node.

Next, a case in which data is transmitted from the slave node 2Ay to the master node 1y will be described. FIG. 4 is a timing chart showing the first signal S1, the drive signal G1, the second signal S2, the drive signal G2, and the bus voltage VBUS during data transmission by the slave node 2Ay.

During the data transmission period of the slave node 2Ay, the master node 1y is still basically in a state of outputting the data[1] to the communication line 3.

During the period when the data[1] is transmitted from the slave node 2Ay (time t21 to t23 with reference to FIG. 4), the drive signal G2 is kept at low level and the slave-side transistor T2 remains off. As a result, the low level period of the pulse width modulation signal PWM is not extended and the pulse width WL remains shorter than the logic judgment value.

On the other hand, during the period when the slave node 2Ay transmits the data[0] to the master node 1y (time t23 to time t27 with reference to FIG. 4), the pulse width WL is expanded to exceed the logic judgment value.

Specifically, the slave node 2Ay drops the second signal S2 to low level after receiving the falling timing of the first signal S1 (=falling timing of the bus voltage VBUS) via the communication line 3. At this time, the data output from the master node 1y (master-side transmission signal) and the data output from the slave node 2Ay (slave-side transfer signal) collide. As a result, the data output by the slave node 2Ay becomes dominant, and the pulse width WL is extended until the timing at which the second signal S2 switches from low level to high level.

More specifically, with reference to FIG. 4, at time t23, the drive signal G1 rises to high level and the bus voltage VBUS drops, causing the slave node 2Ay to detect the falling timing of the first signal S1. Then, at time t24, after a predetermined period, the slave node 2Ay raises the drive signal G2 to high level.

At time t25, the drive signal G1 falls to low level. At time t26, the slave node 2Ay drops the drive signal G2 to low level, when the low level is longer than the pulse width WL recorded in the interval from time t21 to time t23. Thus, by adjusting the timing at which the slave node 2Ay drops the drive signal G2 to low level, the pulse width WL is longer than the logic judgment value, and the data[1] is transmitted from the slave node 2Ay to the master node 1y.

<EMI Noise Consideration>

Incidentally, a steep change in the bus voltage VBUS may result in EMI noise being generated. The generation of EMI noise is explained below.

In the communication device Y, as described above, the master-side drive control circuit 12y adds a slew rate to the drive signal G1 at the logic level switching timing of the first signal S1 (time t21, time t22, time t23, time t27, and time t28 with reference to FIG. 4). The slave-side drive control circuit 16y also adds a slew rate to the drive signal G2 at the logic level switching timing of the second signal S2 (time t26 with reference to FIG. 4).

The speed of transition between the on/off state of the master-side transistor T1 changes according to the slew rate of the drive signal G1. Also, the speed of transition between the on/off state of the slave-side transistor T2 changes according to the slew rate of the drive signal G2. When the bus voltage VBUS changes between the first voltage V1 and the second voltage V2 described above, the slew rate is added to the bus voltage VBUS according to the slew rates of the drive signal G1 and the drive signal G2.

Thus, at the logic level switching timing of the first signal S1 and the logic level switching timing of the second signal S2, the bus voltage VBUS changes relatively slowly with the added slew rate, and the generation of EMI noise is suppressed.

As described above, the slew rates of the drive signal G1 and the drive signal G2 are controlled based on the bus voltage VBUS. In other words, the slew rate of the bus voltage VBUS is feedback controlled to a desired value by receiving the feedback input of the bus voltage VBUS.

Incidentally, in a state where the slave-side transistor T2 is on while the master-side transistor T1 is turned on, even at the logic level switching timing of the second signal S2, EMI noise may be generated. This is due to the following reason.

As described above, in a state where the master-side transistor T1 is on and the slave-side transistor T2 is off (the state immediately before time t24 with reference to FIG. 4), the voltage value of the bus voltage VBUS is the second voltage V2. When the slave-side transistor T2 is on in this state, the bus voltage VBUS drops from the second voltage V2 to the third voltage V3. The potential difference between the second voltage V2 and the third voltage V3 (=about 0.1 V) is much smaller than the potential difference between the first voltage V1 and the second voltage V2 (=about 11 V).

Here, the slew rate added to the bus voltage VBUS is feedback-controlled to be a desired value set as a value added when the bus voltage VBUS is displaced between the first voltage V1 and the second voltage V2 (when the voltage value of the bus voltage VBUS is displaced between about 12 V and about 0.7 V). In contrast, in a case where the bus voltage VBUS is displaced between the second voltage V2 (=about 0.7 V) and the third voltage V3 (about 0.6 V), the potential difference (=about 0.1 V) is relatively small, as described above. When the bus voltage VBUS drops from the second voltage V2 to the third voltage V3, it is difficult to make the slew rate of the bus voltage VBUS reach the desired value by feedback control as described above. Thus, when the bus voltage VBUS drops from the second voltage V2 to the third voltage V3 (when turning on the slave-side transistor T2 while the master-side transistor T1 is on), the bus voltage VBUS is steeply displaced and EMI noise is generated.

Similarly, even at the logic level switching timing of the first signal S1, if the master-side transistor T1 is turned off while the slave-side transistor T2 is on, EMI noise may be generated. This is due to the following reason.

As described above, in a state where both the master-side transistor T1 and the slave-side transistor T2 are on (state during the period from time t24 to time t25 as described with reference to FIG. 4), the voltage value of the bus voltage VBUS is the third voltage V3. When the master-side transistor T1 is turned off in this state, the bus voltage VBUS rises from the third voltage V3 to the second voltage V2. The potential difference between the second voltage V2 and the third voltage V3 (=about 0.1 V) is much smaller than the potential difference between the first voltage V1 and the second voltage V2 (about 11 V). When the master-side transistor T1 is turned off while the slave-side transistor T2 is on, it is difficult to make the slew rate of the bus voltage VBUS reach the desired value by feedback control, as described above. Thus, when the bus voltage VBUS rises from the third voltage V3 to the second voltage V2 (when the master-side transistor T1 is turned off while the slave-side transistor T2 is on), the bus voltage VBUS is steeply displaced and EMI noise is generated.

Figure 5:
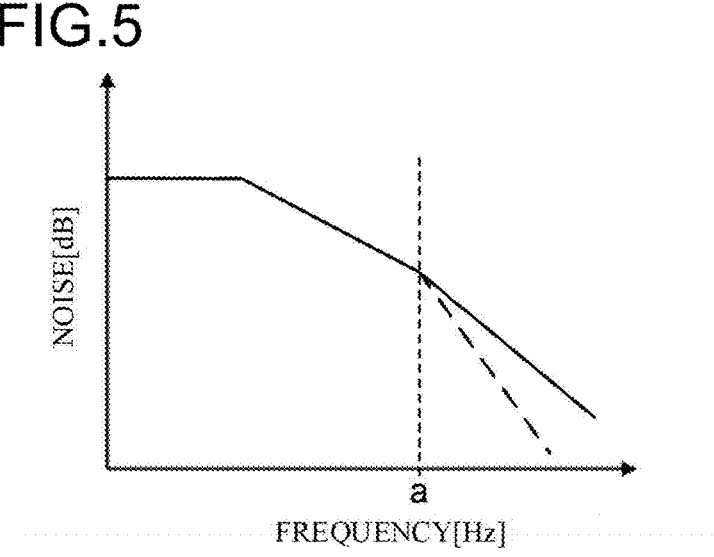
FIG. 5 is a graph comparing an amount of noise generated during data transmission at the master node and during data transmission at the slave node.

FIG. 5 is a graph comparing the amount of noise generated during data transmission at the master node 1y and during data transmission at the slave node 2Ay. In FIG. 5, data transmission by the master node 1y is represented by a dashed line, and data transmission at the slave node 2Ay is represented by a solid line.

Generally, EMI noise has a relatively high-frequency bandwidth among the various types of noise. As shown in FIG. 5, in the band below a given frequency a[Hz], the amount of noise is equivalent between data transmission at the slave node 2Ay and data transmission at the master node 1y. However, in a relatively high frequency band above the frequency a[Hz], the amount of noise is higher during data transmission at the slave node 2Ay than during data transmission at the master node 1y. This is because EMI noise is generated during the period when the slave node 2Ay transmits the data[0] (period from time t23 to time t26, as described with reference to FIG. 4), as described above.

Change of the bus voltage VBUS and EMI noise have been explained, focusing on the diodes D1a to D2b. However, the same problem as described above can be explained even when focusing on the current flowing in the communication line 3 (bus current), that is, a steep change in the bus voltage VBUS causes a steep change in the bus current, which generates EMI noise.

In response to the above-mentioned problem, the communication device X according to the embodiment of the present disclosure is capable of suppressing the generation of EMI noise. The communication device X according to a first embodiment of the present disclosure will be described in detail below. The communication device X according to the embodiment of the present disclosure has a configuration in common with the communication device Y described above. For this reason, common configurations are denotes by the same reference signs and omitted from the description.

<Communication Device of Disclosure>

Similar to the communication device Y described above, the communication device X of the first embodiment of the present disclosure is installed in a vehicle as a means of constructing an in-vehicle local area network (LAN). The communication device X conforms to the CXPI protocol and uses the pulse width modulation signals PWM as line codes between multiple nodes.

Figure 6:
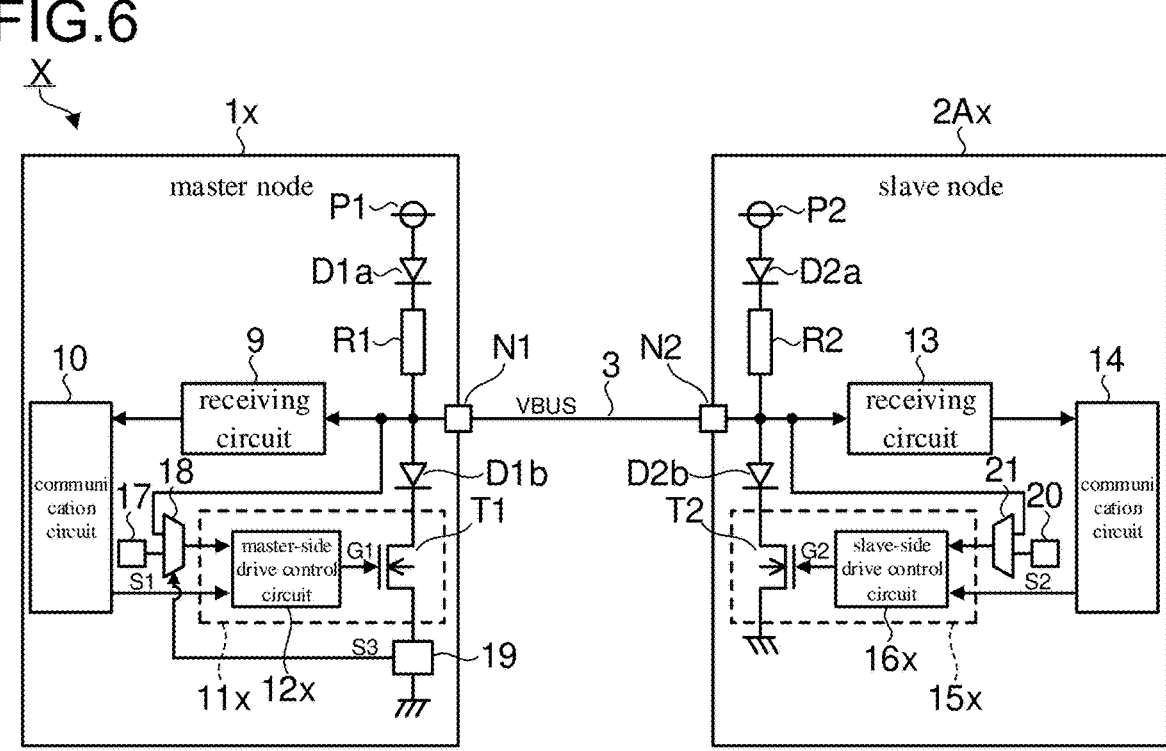
FIG. 6 is a block diagram illustrating a configuration of a communication device according to this disclosure.

FIG. 6 is a block diagram illustrating the configuration of the communication device X of the present disclosure. As illustrated in FIG. 6, the communication device X includes a master node 1x, a slave node 2Ax, and a communication line 3. The master node 1x includes the external terminal N1 as a means of establishing an electrical connection with an external device. The slave node 2Ax includes the external terminal N2 as a means of establishing an electrical connection with an external device.

At least one of the master node 1x or the slave node 2Ax is configured to be switchable between a first state and a second state. The first state is a state in which at least one of the master node 1x or the slave node 2Ax feedback controls the slew rate of the bus voltage VBUS to be a desired value by receiving a feedback input of the bus voltage VBUS. The second state is a state in which at least one of the master node 1x or the slave node 2Ax controls the slew rate of the bus voltage VBUS to be the desired value by receiving a predetermined internal signal input. The specific configurations of the master node 1x and the slave node 2Ax will be described below.

The master node 1x consists of the diode D1a, the diode D1b, the terminating resistor R1, the receiving circuit 9, the communication circuit 10, the control circuit 17, the selector 18, a waveform shaping circuit 11x, and a detection circuit 19.

The communication circuit 10 receives data transmitted from the slave node 2Ax by receiving the output of the receiving circuit 9.

The detection circuit 19 is connected on a current path passing through the master-side transistor T1 (in FIG. 6, between the source of the master-side transistor T1 and the ground end). The detection circuit 19 detects a change in current (=decrease in sink current flowing in the master-side transistor T1) during an ON period Ton of the master-side transistor T1, and inputs a result of the detection to the selector 18 as a current detection signal S3.

The control circuit 17 outputs a predetermined control signal. The selector 18 receives the output of the control circuit 17 and the bus voltage VBUS, selects either the output of the control circuit 17 or the bus voltage VBUS according to the current detection signal S3, and inputs this selection to the waveform shaping circuit 11x (more specifically, a master-side drive control circuit 12x).

The waveform shaping circuit 11x receives the first signal S1 and the output of the selector 18, and transmits data to the slave node 2Ax while controlling the slew rate of the bus voltage VBUS.

In a case where the output of the selector 18 is the bus voltage VBUS, the waveform shaping circuit 11x receives the bus voltage VBUS as a feedback input and feedback-controls the slew rate of the bus voltage VBUS to be the desired value. This state is the first state described above. In a case where the output of the selector 18 is the output of the control circuit 17, waveform shaping circuit 11x receives the control signal (internal signal) output by the control circuit 17 as input and controls the slew rate of the bus voltage VBUS to be the desired value. This state is the second state described above.

Specifically, the waveform shaping circuit 11x includes the master-side drive control circuit 12x and the master-side transistor T1. The master-side drive control circuit 12x generates the drive signal G1 in response to the first signal S1 and the output of the selector 18. More specifically, the master-side drive control circuit 12x generates the drive signal G1 to have the same period as the period of the first signal S1.

The master-side drive control circuit 12x controls the slew rate of the drive signal G1 based on the first signal S1 and the output of the selector 18. Specifically, the master-side drive control circuit 12x adds either a slew rate based on the bus voltage VBUS or a slew rate based on the output of the control circuit 17 to the drive signal G1 at the logic level switching timing of the first signal S1.

The slave node 2Ax consists of the diode D2$a$, the diode D2$b$, the receiving circuit 13, the communication circuit 14, a waveform shaping circuit 15$x$, and the termination resistor R2.

The communication circuit 14 receives the data transmitted from the master node 1$x$ by receiving the output of the receiving circuit 13. The communication circuit 14 also transmits data to the master node 1$x$ by outputting the second signal S2 obtained by superimposing data on the communication clock extracted from the output of the receiving circuit 13 to the waveform shaping circuit 15$x$ (more precisely, to a slave-side drive control circuit 16$x$ to be described below).

The control circuit 20 outputs a predetermined control signal. A selector 21 receives the output of the control circuit 20 and the bus voltage VBUS, and inputs either the output of the control circuit 20 or the bus voltage VBUS to the waveform shaping circuit 15$x$ (more precisely, the slave-side drive control circuit 16$x$) under a predetermined condition. In other words, the communication circuit 14 switches the output of the selector 21 to either the output of the control circuit 20 or the bus voltage VBUS to synchronize with the logic level switching timing of the second signal S2.

The waveform shaping circuit 15$x$ receives the second signal S2 and the output of the selector 21 and transmits data to the master node 1$x$ while controlling the slew rate of the bus voltage VBUS.

In a case where the output of the selector 21 is the bus voltage VBUS, the waveform shaping circuit 15$x$ receives the bus voltage VBUS as feedback input and feedback-controls the slew rate of the bus voltage VBUS to be the desired value. This state is the first state described above. In a case where the output of the selector 21 is the output of the control circuit 20, the waveform shaping circuit 15$x$ receives the control signal (internal signal) output by the control circuit 20 as input and controls the slew rate of the bus voltage VBUS to be the desired value. This state is the second state described above.

Specifically, the waveform shaping circuit 15$x$ includes the slave-side drive control circuit 16$x$ and the slave-side transistor T2. The slave-side drive control circuit 16$x$ generates the drive signal G1 in response to the second signal S2 and the output of the selector 21. More precisely, the slave-side drive control circuit 16$x$ generates the drive signal G2 to have the same period as the period of the second signal S2.

The slave-side drive control circuit 16$x$ controls the slew rate of the drive signal G2 based on the second signal S2 and the output of the selector 21. Specifically, the slave-side drive control circuit 16$x$ adds either a slew rate based on the bus voltage VBUS or a slew rate based on the output of the control circuit 20 to the drive signal G2 at the logic level switching timing of the second signal S2.

Slew rate control of the bus voltage VBUS by the communication device X according to the present embodiment is described in more detail below.

Figure 7:
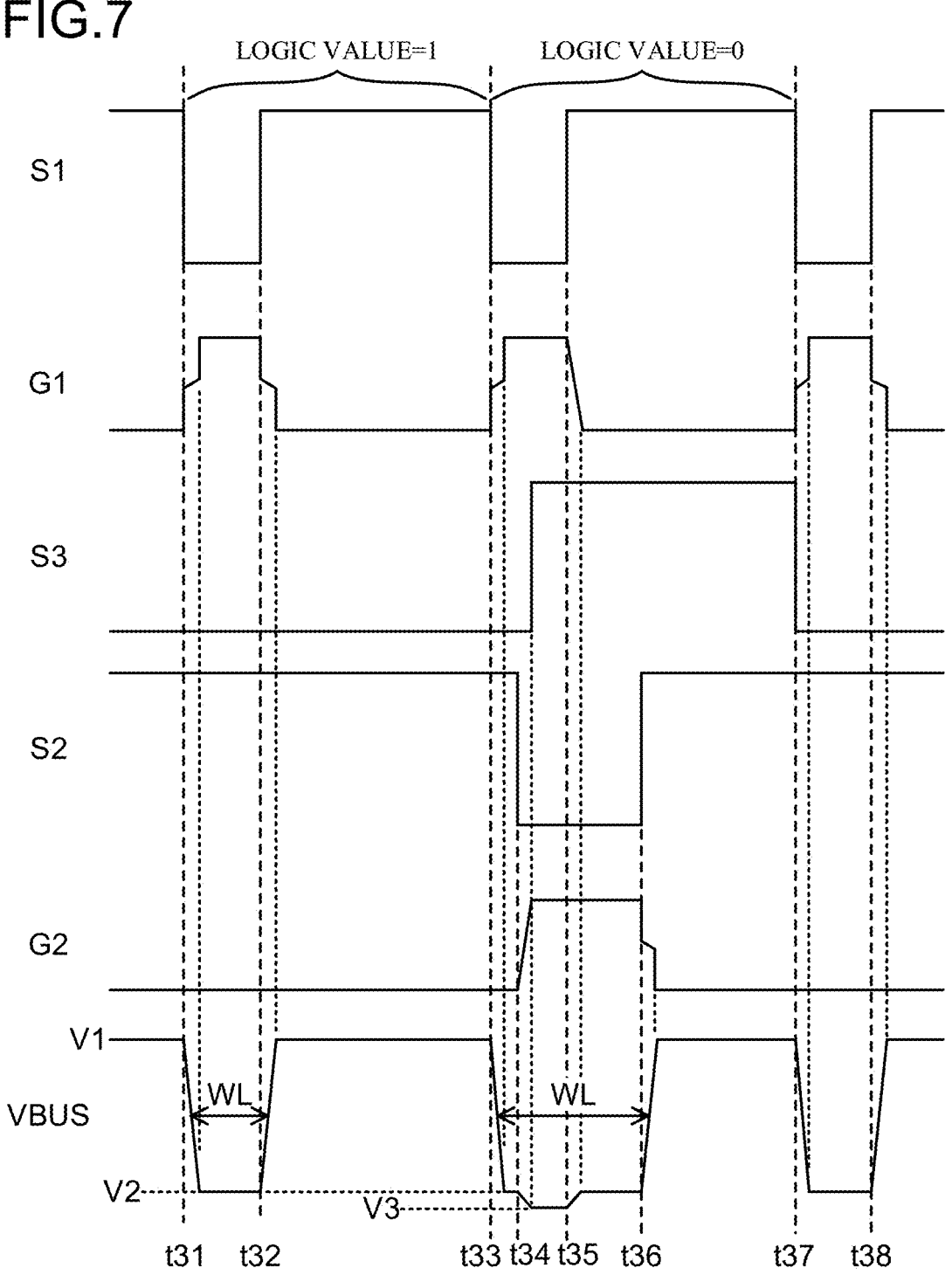
FIG. 7 is a timing chart showing a first signal, a drive signal, a current detection signal, a second signal, a drive signal, and bus voltage during data transmission at the slave node.

FIG. 7 is a timing chart illustrating the first signal S1, the drive signal G1, the current detection signal S3, the second signal S2, the drive signal G2, and the bus voltage VBUS during data transmission at the slave node 2Ax.

The slave node 2Ax switches to the second state at a first timing. The first timing is a timing at which the logic level of the second signal S2 switches from high level (=recessive level) to low level (=dominant level). With reference to FIG. 7, the first timing is time t34.

On the other hand, the master node 1$x$ switches to the second state at a second timing. The second timing is a timing at which the logic level of the first signal S1 switches when the second signal S2 is set to low level (=dominant level) by the slave node 2Ax. With reference to FIG. 7, the second timing is time t35.

The master node 1$x$ switches to the first state at a third timing. The third timing is a timing at which the logic level of the first signal S1 switches when the second signal S2 is set to high level (=recessive level) by the slave node 2Ax. With reference to FIG. 7, the third timing is time t31, time t32, time t33, time t37 and time t38.

The master node 1$x$ determines whether the logic level switching timing of the first signal S1 is the second timing or the third timing based on the current detection signal S3 output by the detection circuit 19.

The slave node 2Ax switches to the first state at a fourth timing. The fourth timing is a timing at which the logic level of the second signal S2 switches from low level (=dominant level) to high level (=recessive level). With reference to FIG. 7, the fourth timing is t36.

The following is a more specific explanation with reference to FIG. 7. At time t31, time t33, and time t37 (=third timing), the first signal S1 falls to low level and the drive signal G1 rises to high level. Thus, the slave-side transistor T2 remains off and the master-side transistor T1 turns on. As a result, the bus voltage VBUS drops from the first voltage V1 to the second voltage V2.

At time t31 and time t33, the detection circuit 19 outputs the current detection signal S3, which is low level. At time t37, the detection circuit 19 detects that the bus voltage VBUS is the first voltage V1 and lowers the current detection signal S3 to low level. The selector 18 receives the low-level current detection signal S3, selects the bus voltage VBUS, and inputs the bus voltage VBUS to the master-side drive control circuit 12$x$. Then, a slew rate is added to the drive signal G1 based on the bus voltage VBUS and rises from low level to high level. As a result, at time t31, time t33, and time t37 (=third timing), the slew rate (specifically, the slew rate that is feedback-controlled to be a desired value by receiving the feedback input of the bus voltage VBUS) is added to the bus voltage VBUS.

At time t32 and time t38 (=third timing), the first signal S1 rises from low level to high level, the drive signal G1 falls to low level, and both the master-side transistor T1 and the slave-side transistor T2 turn off. As a result, the bus voltage VBUS rises from the second voltage V2 to the first voltage V1.

At this time, the detection circuit 19 outputs the low-level current detection signal S3. Thus, the selector 18 receives the low-level current detection signal S3, selects the bus voltage VBUS, and inputs the bus voltage VBUS to the master-side drive control circuit 12$x$. As a result, the second slew rate is added to the drive signal G1, and the drive signal G1 falls from high level to low level. Therefore, at time t32 and time t38 (=third timing), the slew rate (specifically, the slew rate that is feedback-controlled to be a desired value by receiving the feedback input of the bus voltage VBUS) is added to the bus voltage VBUS.

At time t34 (=first timing), the second signal S2 rises to high level while the first signal S1 is at low level. At this time, the slave-side transistor T2 turns on while the master-side transistor T1 is on, and the bus voltage VBUS drops from the second voltage V2 to the third voltage V3.

At this time, the selector 21 selects the output of the control circuit 20 and outputs this to the slave-side drive control circuit 16x. Thus, the drive signal G2 rises from low level to high level in a state where the slew rate based on the output of the control circuit 20 is added. As a result, at time t34, the slew rate (specifically, the slew rate controlled to be the desired value by receiving the internal signal (=output signal of the control circuit 20)) is added to the bus voltage VBUS.

After the arrival of time t34 and before the arrival of time t35, the detection circuit 19 detects a change in current in the ON period Ton of the master-side transistor T1 and raises the logic level of the current detection signal S3 from low level to high level. Then, the selector 18 selects the output of the control circuit 17 based on the current detection signal S3 and outputs this to the master-side drive control circuit 12x.

At time t35 (second timing), the first signal S1 rises to high level from a state in which both the first signal S1 and the second signal S2 are low level. At this time, only the master-side transistor T1 turns off from the state where both the master-side transistor T1 and the slave-side transistor T2 are on. Then, the bus voltage VBUS rises from the third voltage V3 to the second voltage V2.

At this time, as described above, the logic level of the current detection signal S3 is high level, and the selector 18 receives the high-level current detection signal S3, selects the output of the control circuit 17, and outputs this to the master-side drive control circuit 12x. Thus, the second slew rate is added to the drive signal G1, and the drive signal G1 falls from high level to low level. As a result, at time t35, the slew rate (specifically, the slew rate controlled to be the desired value by receiving the internal signal (=output signal of the control circuit 17)) is added to the bus voltage VBUS.

At time t36 (=fourth timing), the second signal S2 rises from low level to high level, the drive signal G2 falls from high level to low level, and both the master-side transistor T1 and the slave-side transistor T2 turn off. As a result, the bus voltage VBUS rises from the second voltage V2 to the first voltage V1.

At this time, the selector 21 selects the bus voltage VBUS and outputs the bus voltage VBUS to the slave-side drive control circuit 16x. Thus, a slew rate based on the bus voltage VBUS is added to the drive signal G2, and the drive signal G2 falls from high level to low level. As a result, at time t36 (=fourth timing), the slew rate (slew rate that is feedback-controlled to be a desired value by receiving the feedback input of the bus voltage VBUS) is added to the bus voltage VBUS.

As described above, by switching to either the first state or the second state, when the slave-side transistor T2 is turned on while the master-side transistor T1 is on, and when the master-side transistor T1 is turned off while the slave-side transistor T2 is on, the desired slew rate can be added to the bus voltage VBUS. Accordingly, EMI noise can be suppressed.

<Glitching Considerations>

Incidentally, in a case where the pulse width of the low level of the first signal S1 is relatively small (e.g., the minimum value in a range conforming to the communication standard) even if the pulse width is a value that can be adopted under the communication standard (=CXPI protocol), a so-called glitch may occur due to the slew rate control mentioned above. When glitching occurs, which is not allowed by the communication standard, bidirectional communication between the master node 1x and the slave node

2Ax may become unstable (or fail). The occurrence of glitching will be explained in detail below with reference to FIG. 8.

Figure 8:
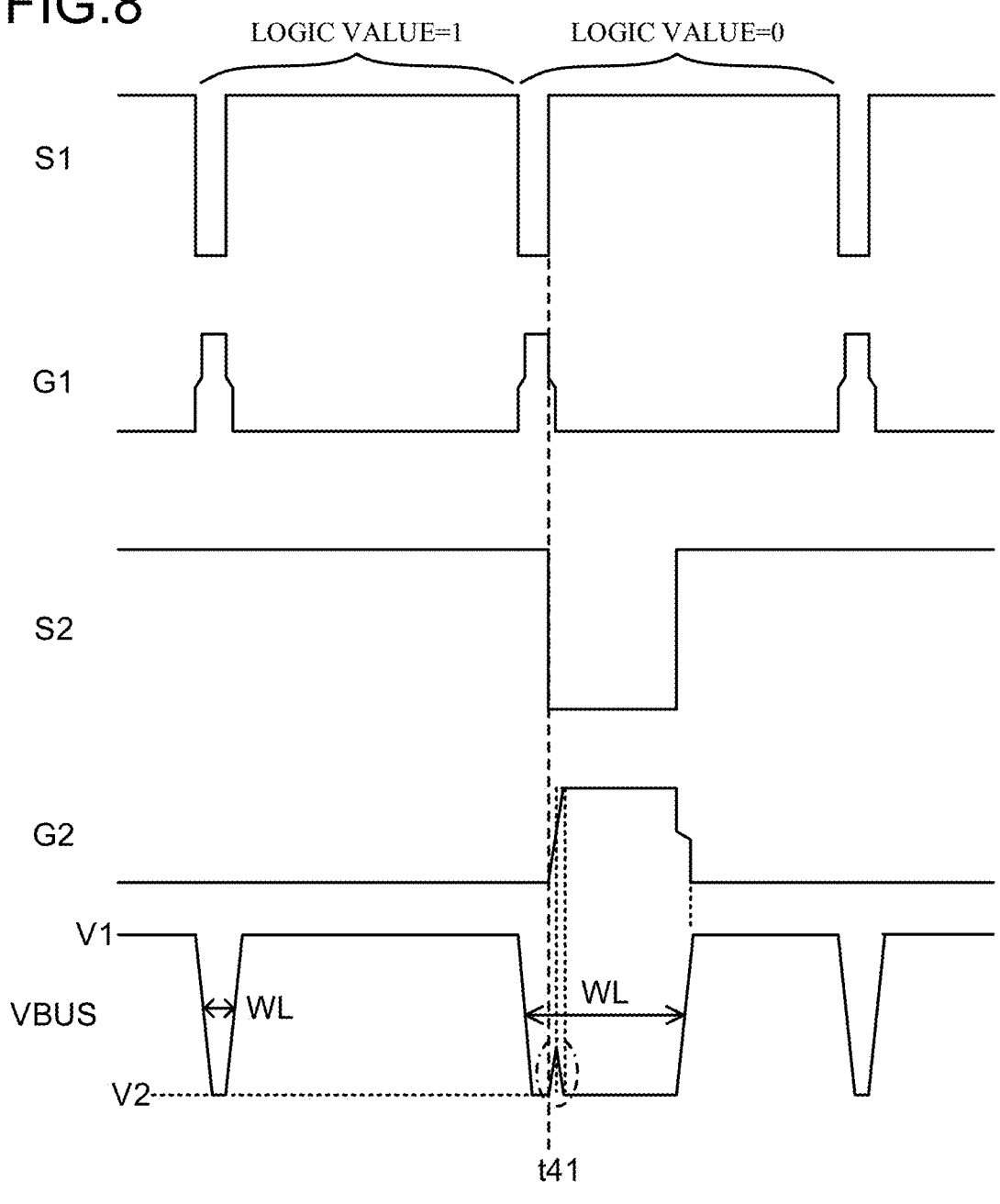
FIG. 8 is a timing chart showing a first signal, a drive signal, a second signal, a drive signal, and bus voltage during data transmission at the slave node.

FIG. 8 is a timing chart showing the first signal S1, the drive signal G1, the second signal S2, the drive signal G2, and the bus voltage VBUS during data transmission at the slave node 2Ax.

Here, as mentioned above, a slew rate is added to the drive signal G2 when the drive signal G2 rises from low level to high level. Suppose that the pulse width of the low level of the first signal S1 is the minimum width that satisfies the communication standard. Then, at time t41, while the drive signal G2 rises to high level, the drive signal G1 falls to low level, and this may cause the so-called glitch (see the dotted frame in FIG. 8) at which the bus voltage VBUS rises momentarily.

To deal with such a problem, the communication device X according to a second embodiment of the present disclosure can suppress the occurrence of glitches. The second embodiment of the communication device X will now be described. In the following description, differences from the first embodiment will be described, and the same configurations as in the first embodiment will be denoted by the same reference signs and omitted from the description.

Figure 9:
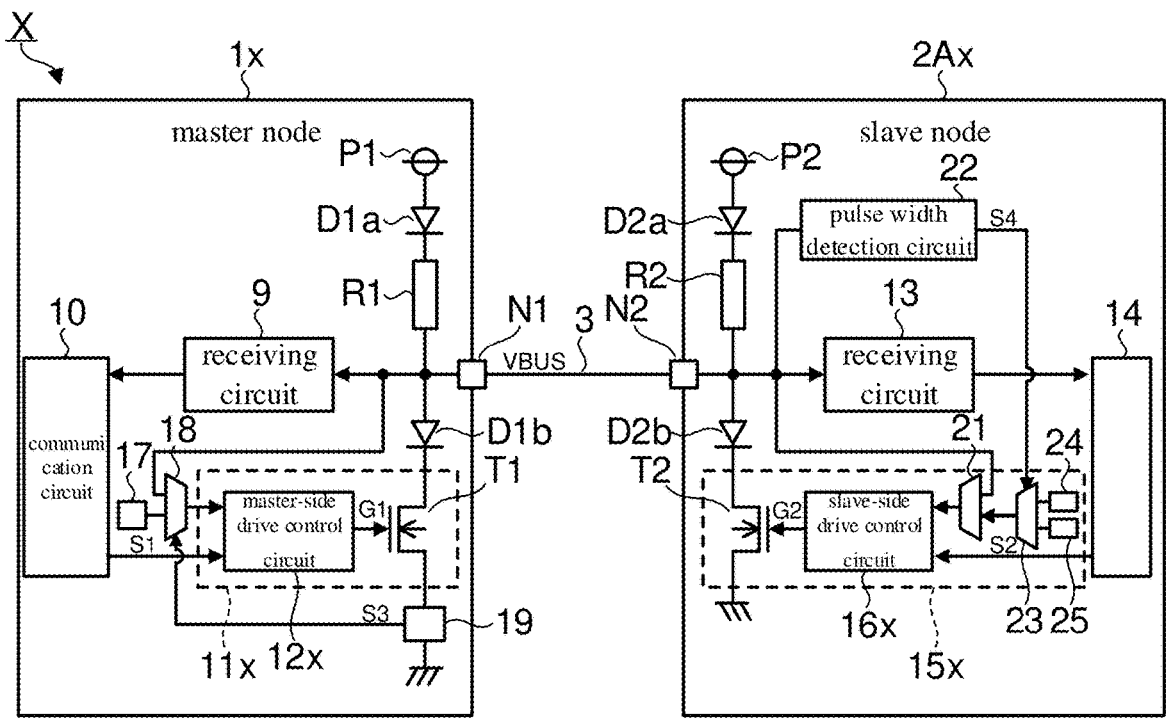
FIG. 9 is a block diagram illustrating a configuration of a communication device according to a second embodiment of the present disclosure.

FIG. 9 is a block diagram illustrating a configuration of the communication device X according to the second embodiment of the present disclosure. As illustrated in FIG. 9, the waveform shaping circuit 15x of the second embodiment of the communication device X includes the slave-side drive control circuit 16x, the selector 21, a pulse width detection circuit 22, a selector 23, and control circuits 24 and 25.

The pulse width detection circuit 22 detects the pulse width WL of the bus voltage VBUS (=pulse width modulation signal PWM) and outputs a detection signal S4 corresponding to the pulse width WL to the selector 23. More specifically, the pulse width detection circuit 22 detects whether the pulse width WL of the bus voltage VBUS is greater than or equal to a predetermined threshold value TH or not, and outputs the detection signal S4 reflecting the detection result.

The selector 23 receives the output of the control circuit 24 and the output of the control circuit 25, selects either the output of the control circuit 24 or the output of the control circuit 25 according to the detection signal S4, and outputs the selection to the selector 21.

The selector 21 receives the output of the selector 23 and the bus voltage VBUS, selects either the output of the selector 23 or the bus voltage VBUS under a predetermined criterion, and inputs the selection to the waveform shaping circuit 15x (more specifically, the slave-side drive control circuit 16x).

Specifically, in a case where the relationship of pulse width WL≥threshold value TH is established, the selector 23 selects the output of the control circuit 24 according to the detection signal S4 and inputs the output to the selector 21. When the output of the control circuit 24 is input to the slave-side drive control circuit 16x by the selector 21, a relatively gradual slew rate is added to the rising/falling edge of the drive signal G2. The slew rate added to the bus voltage VBUS at this time is referred to as a first slew rate.

On the other hand, in a case where the relationship of pulse width WL<threshold value TH is established, the selector 23 selects the output of the control circuit 25 according to the detection signal S4 and inputs the output to the selector 21. When the output of the control circuit 25 is input to the slave-side drive control circuit 16x by the selector 21, a relatively steep slew rate (steeper than when the output of the control circuit 24 is input to the slave-side drive control circuit 16x) is added to the rising/falling edge of the drive signal G2. The slew rate added to the bus voltage VBUS at this time is a second slew rate.

Figure 10:
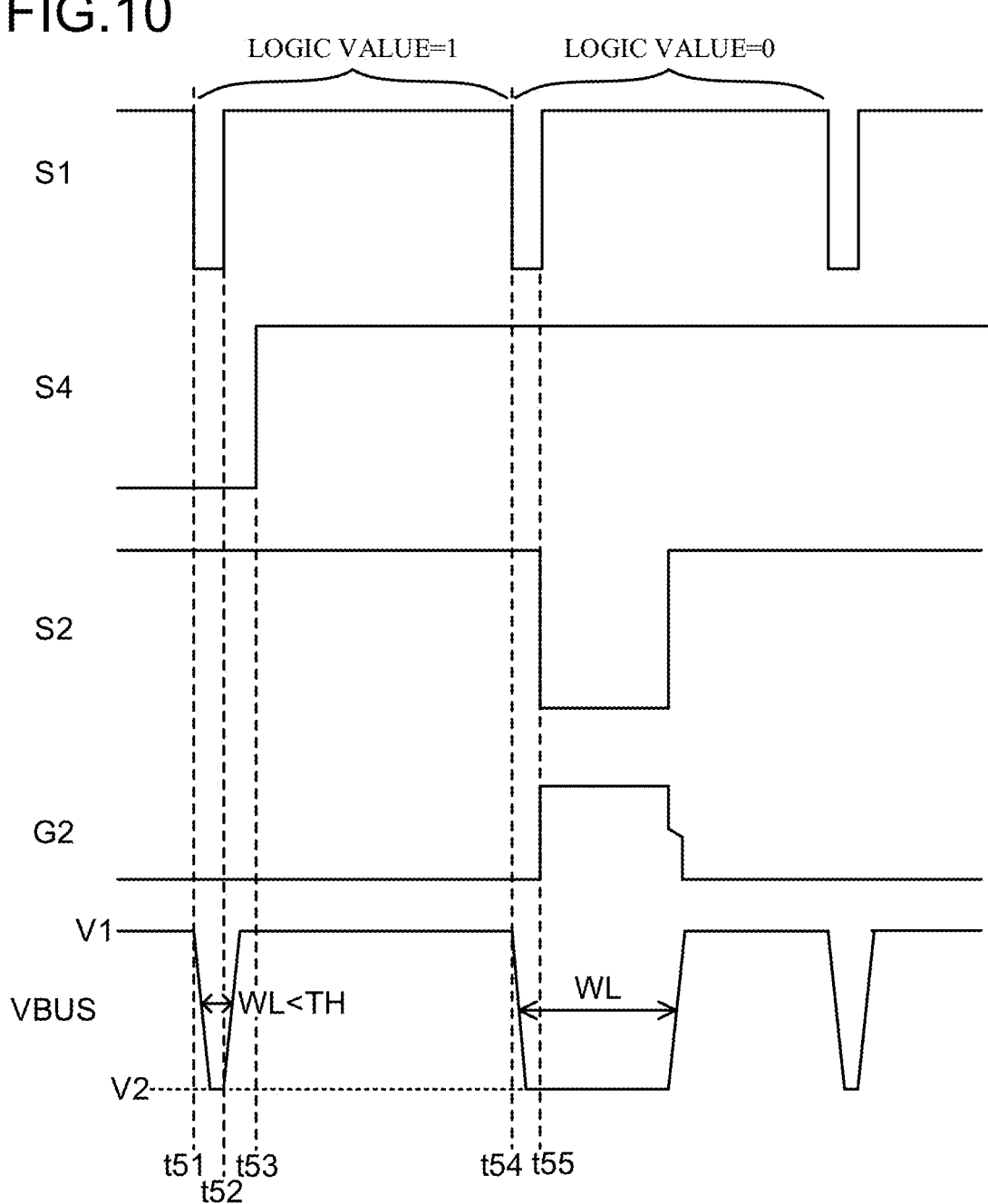
FIG. 10 is a timing chart showing a first signal, a detection signal, a second signal, a drive signal, and bus voltage during data transmission at a slave node according to the second embodiment of the present disclosure.

FIG. 10 is a timing chart showing the first signal S1, the detection signal S4, the second signal S2, the drive signal G2, and the bus voltage VBUS during data transmission at the slave node 2Ax according to the second embodiment of the present disclosure. With reference to FIG. 10, at time t51, the first signal S1 falls to low level. When time t52 arrives, the first signal S1 rises to high level. At this time, the pulse width detection circuit 22 detects whether the pulse width WL is greater than or equal to the predetermined threshold value TH or not.

As shown in FIG. 10, when the pulse width WL is less than the threshold value TH, at time t53, the pulse width detection circuit 22 raises the detection signal S4 from low level to high level. After the first signal S1 falls to low level at time t54, when the second signal S2 falls to low level at time t55, the slave-side drive control circuit 16x raises the drive signal G2 steeply. Specifically, upon receiving the detection signal S4, the selector 23 selects the output of the control circuit 25 and inputs the output to the selector 21. The selector 21 selects the output of the control circuit 25 thus input, and inputs this to the slave-side drive control circuit 16x. In response, the slave-side drive control circuit 16x raises the drive signal G2 steeply. As a result, when the first signal S1 falls to low level at time t55, the slave-side transistor T2 transitions to the ON state before the above-described glitch occurs. This suppresses the occurrence of glitches.

Here, the pulse width detection circuit 22 always detects the immediately preceding pulse width WL and outputs the detection signal S4 corresponding to the detection result. In a case where the pulse width WL is changed from less than the threshold value TH to greater than or equal to the threshold value TH, the pulse width detection circuit 22 detects the pulse width WL and lowers the detection signal S4 to low level before the fall timing of the first signal S1 immediately after the change. With this configuration, a relatively gradual slew rate is added to the drive signal G2, and the drive signal G2 rises to high level. Thus, the slew rate of the drive signal G2 always changes according to the pulse width WL at the falling timing of the immediately preceding first signal S1.

<Waveform Shaper>

Figure 11:
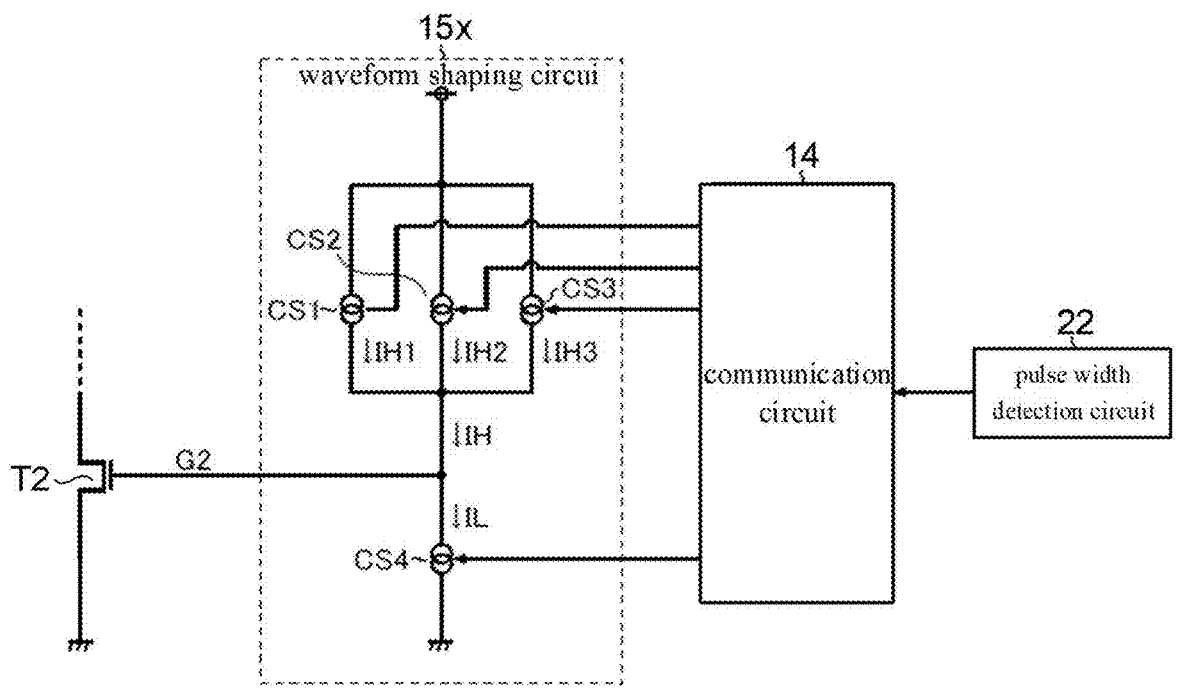
FIG. 11 is a block diagram illustrating an example of a waveform shaping circuit.

The configuration of the waveform shaping circuit 15x will now be described in more detail. FIG. 11 is a block diagram illustrating an example of the waveform shaping circuit 15x. The waveform shaping circuit 15x is configured of current sources CS1 to CS4.

The current sources CS1 to CS3 are connected in parallel between the power supply end and the gate (=an application end to which the drive signal G2) of the slave-side transistor T2. Each current source CS1 to CS3 generates an ON current IH1 to IH3 to switch the drive signal G2 to high level (=logic level when ON), respectively. The ON currents IH1 to IH3 may be the same current values or different current values.

The current source CS4 is connected between the gate of the slave-side transistor T2 (=an application end to which the drive signal G2) and the ground end, and generates an OFF current IL to switch the drive signal G2 to low level (=logic level when off).

When the drive signal G2 is set to high level, the communication circuit 14 turns on at least one of the current sources CS1 to CS3 and turns off the current source CS4. On the other hand, when the drive signal G2 is set to low level, the communication circuit 14 turns off all of the current sources CS1 to CS3 and turns on the current source CS4.

The communication circuit 14 also has a function of individually turning on/off the current sources CS1 to CS3 (and thus the ON currents IH1 to IH3) according to the output of the pulse width detection circuit 22 when the drive signal G2 is raised from low level to high level. In other words, the communication circuit 14 has a function of controlling the magnitude of the on-current IH flowing into the gate capacitance of the slave-side transistor T2.

For example, in a case where the current source CS1 is on and the current sources CS2 and CS3 are off, IH=IH1. If, for example, the current sources CS1 and CS2 are on and the current source CS3 is off, IH=IH1+IH2. Additionally, if all of the current sources CS1 to CS3 are turned on, for example, IH=IH1+IH2+IH3.

The smaller the ON current IH, the more gradually the drive signal G2 rises. Thus, the current flowing during the ON transition of the slave-side transistor T2 is limited and the bus voltage VBUS falls gradually. Conversely, the larger the ON current IH, the more steeply the drive signal G2 rises. Thus, the bus voltage VBUS rises steeply.

Accordingly, for example, when the pulse width WL of the pulse width modulation signal PWM is larger than the threshold value TH, EMI noise can be suppressed by not turning on all of the current sources CS1 to CS3 and by narrowing the ON current IH to a small value.

On the other hand, when the pulse width WL of the pulse width modulation signal PWM is smaller than the threshold value TH, all the current sources CS1 to CS3 are turned on such that more of the ON current IH flows, which enables to improve communication stability.

Other Modifications

In addition to the above embodiments, the various technical features disclosed herein can also be modified within a range not departing from the main idea of the technical concept herein. In other words, the above embodiments should be considered exemplary and not restrictive in all respects, and it should be understood that the technical scope of the present disclosure is not limited to the above embodiments and includes all modifications falling within the scope and equivalent meaning of the claims.

For example, in the above embodiment, an in-vehicle communication system conforming to the CXPI protocol is used as an example, but the application of the present disclosure is not limited thereto. A communication system using a similar working principle to that above, that is, pulse width modulation signals used as line codes between multiple nodes may be used, and in the case of collision between the transmission signals at the nodes, the node that has been transmitting the dominant level for a longer period of time will be dominant in the arbitration.

The master-side transistor T1 and the slave-side transistors T2 are described as NMOSFETs, but master-side transistor T1 and the slave-side transistors T2 can also be npn-type bipolar transistors or N-channel insulated gate bipolar transistors (IGBTs).

Supplementary Notes

A communication device (x) disclosed herein includes a communication line (3); a master node (1x) connected to the communication line (3); and a slave node (1Ax) connected to the communication line (3), in which the master node (1*x*) and the slave node (1A*x*) communicate with each other by using a pulse width modulation signal (PWM) as a line code, and at least one of the master node (1*x*) or the slave node (1A*x*) is configured to switch to either a first state in which feedback input of a bus voltage (VBUS) of the communication line (3) is received to control a slew rate of the bus voltage (VBUS) to a desired value, and a second state in which input of a predetermined control signal is received to control the slew rate of the bus voltage (VBUS) to a desired value (first configuration).

Note that, in the communication device (x) according to the first configuration, the master node (1*x*) may be configured to generate a master-side transmission signal (S1) that varies in logic level between a dominant level and a recessive level and transmit the master-side transmission signal (S1) to the slave node (1A*x*) via the communication line (3), the slave node (1A*x*) may be configured to generate a slave-side transfer signal (S2) that varies in logic level between a dominant level and a recessive level and transmit the slave-side transfer signal (S2) to the master node (1*x*) via the communication line (3), in a case where the master-side transmission signal (S1) and the slave-side transfer signal (S2) collide in the communication line (3), whichever of the master-side transmission signal (S1) and the slave-side transfer signal (S2) that maintains the dominant level for longer may be transmitted with priority, the slave node (1A*x*) may switch to the second state at a first timing at which the logic level of the slave-side transfer signal (S2) switches from the recessive level to the dominant level, and the master node (1*x*) may switch to the second state at a second timing at which the logic level of the master-side transmission signal (S1) switches when the slave node (1A*x*) sets the slave-side transfer signal (S2) to the dominant level (second configuration).

In the communication device (x) according to the second configuration, the master node (1*x*) may switch to the first state at a third timing at which the logic level of the master-side transmission signal (S1) switches when the slave node (1A*x*) sets the slave-side transfer signal (S2) to the recessive level, and the slave node (1A*x*) may switch to the first state at a fourth timing at which the logic level of the slave-side transfer signal (S2) switches from the dominant level to the recessive level (third configuration).

In the communication device (x) according to the second or third configuration, the master node (1*x*) may include a master-side transistor (T1) connected to the communication line (3); and a master-side drive control circuit (12*x*) configured to control a first drive signal (G1) of the master-side transistor (T1), the slave node (1A*x*) may include a slave-side transistor (T2) connected to the communication line (3); and a slave-side drive control circuit (16*x*) configured to control a second drive signal (G2) of the slave-side transistor (T2), and the master node (1*x*) and the slave node (1A*x*) may be configured to change the bus voltage (VBUS) by controlling an ON/OFF state of the first transistor and the second transistor (fourth configuration).

In the communication device (x) according to any of the second to fourth configurations, the master node (1*x*) may include a detection circuit (19) configured to detect, on the basis of the bus voltage (VBUS), whether a timing at which the logic level of the master-side transmission signal (S1) to arrive is the second timing or the third timing, and the master-side drive control circuit (12*x*) may control the first drive signal (G1) according to a detection result of the detection circuit (19) (fifth configuration).

In the communication device (x) according to any of the second to fifth configurations, in the second state, as the desired value, a slew rate of the bus voltage (VBUS) may be controlled to a predetermined first slew rate or a second slew rate steeper than the first slew rate, the slave node (1A*x*) may include a pulse width detection circuit (22) configured to detect a pulse width between a timing at which a logic level of the master-side transmission signal (S1) switches from the recessive level to the dominant level and a timing at which the logic level of the master-side transmission signal (S1) next switches, and at the second timing, the slave node may switch a slew rate of the bus voltage (VBUS) to the second slew rate when the pulse width is less than or equal to an interval between the second timing and the immediately preceding third timing (sixth configuration).

The communication device (x) according to any of the first to sixth configurations conforms to the CXPI protocol (seventh configuration).

With the communication device (x) according to the first configuration, even if it is difficult to control the slew rate of the bus voltage (VBUS) to a desired value in the first state, the slew rate of the bus voltage (VBUS) can be controlled by switching to the second state. Therefore, a steep change in the bus voltage (VBUS) can be suppressed and EMI noise generation can be suppressed.

With the communication device (x) according to the second configuration, even if it is difficult to control the slew rate of the bus voltage (VBUS) to a desired value in the first state at the first timing and the second timing, the slew rate of the bus voltage (VBUS) can be controlled by switching to the second state. Therefore, a steep change in the bus voltage (VBUS) can be more suitably suppressed and EMI noise generation can be suppressed.

With the communication device (x) according to the third configuration, the slew rate of the bus voltage (VBUS) can be suitably controlled by feedback control by switching to the first state at the third timing and the fourth timing.

With the communication device (x) according to the fourth configuration, the bus voltage (VBUS) can be controlled more suitably.

With the communication device (x) according to the fifth configuration, it is possible to select timing for controlling the slew rate of the bus voltage (VBUS) more appropriately.

With the communication device (x) according to the sixth configuration, even if the pulse width is less than or equal to the interval between the second timing and the immediately preceding third timing at the second timing, since the bus voltage (VBUS) rises at the second slew rate, rise of the bus voltage (VBUS) can be suppressed to before the timing at which the logic level of the master-side transmission signal (S1) is switched to arrive. This can suppress the occurrence of glitches.

With the communication device (x) according to the seventh configuration, in the communication device (x) conforms to the CXPI protocol, the occurrence of EMI noise can be more suitably suppressed.

What is claimed is:

1. A communication device comprising:
   a communication line;
   a master node connected to the communication line; and
   a slave node connected to the communication line, wherein
   the master node and the slave node communicate with each other by using a pulse width modulation signal as a line code,
   at least one of the master node or the slave node is configured to switch to either a first state in which feedback input of a bus voltage of the communication line is received to control a slew rate of the bus voltage to a desired value, and a second state in which input of a predetermined control signal is received to control the slew rate of the bus voltage to a desired value, the master node is configured to generate a master-side transmission signal that varies in logic level between a dominant level and a recessive level and transmit the master-side transmission signal to the slave node via the communication line, the slave node is configured to generate a slave-side transfer signal that varies in logic level between a dominant level and a recessive level and transmit the slave-side transfer signal to the master node via the communication line, in a case where the master-side transmission signal and the slave-side transfer signal collide in the communication line, whichever of the master-side transmission signal and the slave-side transfer signal that maintains the dominant level for longer is transmitted with priority, the slave node switches to the second state at a first timing at which the logic level of the slave-side transfer signal switches from the recessive level to the dominant level, and the master node switches to the second state at a second timing at which the logic level of the master-side transmission signal switches when the slave node sets the slave-side transfer signal to the dominant level.

2. The communication device according to claim 1, wherein the master node switches to the first state at a third timing at which the logic level of the master-side transmission signal switches when the slave node sets the slave-side transfer signal to the recessive level, and the slave node switches to the first state at a fourth timing at which the logic level of the slave-side transfer signal switches from the dominant level to the recessive level.

3. The communication device according to claim 2, wherein the master node includes:

a master-side transistor connected to the communication line; and a master-side drive control circuit configured to control a first drive signal of the master-side transistor, the slave node includes:

a slave-side transistor connected to the communication line; and a slave-side drive control circuit configured to control a second drive signal of the slave-side transistor, and the master node and the slave node are configured to change the bus voltage by controlling an ON/OFF state of the master-side transistor and the slave-side transistor.

4. The communication device according to claim 3, wherein the master node includes a detection circuit configured to detect, on the basis of the bus voltage, whether a timing at which the logic level of the master-side transmission signal to arrive is the second timing or the third timing, and the master-side drive control circuit controls the first drive signal according to a detection result of the detection circuit.

5. The communication device according to claim 1, wherein in the second state, as the desired value, a slew rate of the bus voltage is controlled to a predetermined first slew rate or a second slew rate steeper than the first slew rate, the slave node includes:

a pulse width detection circuit configured to detect a pulse width between a timing at which a logic level of the master-side transmission signal switches from the recessive level to the dominant level and a timing at which the logic level of the master-side transmission signal next switches, and at the second timing, the slave node switches a slew rate of the bus voltage to the second slew rate when the pulse width is less than or equal to an interval between the second timing and an immediately preceding third timing.

6. The communication device according to claim 1, wherein the communication device conforms to a clock extension peripheral interface protocol.

* * * * *